(12) United States Patent
Mansour et al.

(10) Patent No.: US 7,616,696 B1
(45) Date of Patent: Nov. 10, 2009

(54) SYSTEM AND METHOD TO INCREASE SECTOR THROUGHPUT IN A MULTI-CARRIER OPERATION

(75) Inventors: Nagi A. Mansour, Arlington, VA (US); Alex Shusterman, Vienna, VA (US)

(73) Assignee: Nextel Communications, Inc., Reston, VA (US)

( * ) Notice: Subject to any disclaimer, the term of this patent is extended or adjusted under 35 U.S.C. 154(b) by 583 days.

(21) Appl. No.: 11/453,114

(22) Filed: Jun. 14, 2006

(51) Int. Cl.
  *H04L 27/28* (2006.01)
(52) U.S. Cl. ..................... 375/260; 375/219
(58) Field of Classification Search ................. 375/219, 375/220, 130, 143, 144, 148
  See application file for complete search history.

(56) References Cited

U.S. PATENT DOCUMENTS

| | | | |
|---|---|---|---|
| 5,511,067 | A | 4/1996 | Miller |
| 6,278,701 | B1 | 8/2001 | Ayyagari et al. |
| 6,606,311 | B1 | 8/2003 | Wang et al. |
| 6,744,753 | B2 | 6/2004 | Heinonen et al. |
| 6,859,446 | B1 | 2/2005 | Gopalakrishnan et al. |
| 6,901,046 | B2 | 5/2005 | Hsu et al. |
| 6,990,324 | B2 | 1/2006 | Laroia et al. |
| 7,103,350 | B2 | 9/2006 | Au et al. |
| 2003/0176191 | A1* | 9/2003 | Cornett et al. ............... 455/445 |
| 2004/0043751 | A1* | 3/2004 | Amalfitano et al. .......... 455/403 |
| 2004/0136445 | A1* | 7/2004 | Olson et al. .................. 375/148 |
| 2005/0271028 | A1* | 12/2005 | Proctor, Jr. .................. 370/345 |

OTHER PUBLICATIONS

AII-IP 1xEV-DO Wireless Data Networks, A Technical White Pater, Airvana, Inc., Jun. 2002, pp. 1-13, Chelmsford, USA.

Dr. Ariela Zeira, Evolution of 3G Wireless Systems, High speed downlink packet access and beyond, Wireless Design & Development, Sep. 2003, pp. 20-21.

1xEV: 1x EVolution IS- TIA/EIA Standard, Airlink Overview, Qualcomm, Inc., Nov. 7, 2001, pp. 1-27.

Suk Won Kim, Dong Sam Ha, and Jeong Ho Kim, Performance Gain of Smart Dual Antennas at Handsets in 3G CDMA System, VTVT (Virginia Tech VLSI for Telecommunications) Laboratory, Blacksburg, USA.

Huai-Rong Shao, Chia Shen, Daqing Gu, Jinyun Zhang, and Philip Orlik, Dynamic Resource Control for High-Speed Downlink Packet Access Wirless Channel, Mitsubishi Electric Research Laboratories, Cambridge, USA.

Masashi Hiraiwa, Yasumasa Ishada, Masaaki Yoshimura, Toru Sakaibara, Toshiyuki Sakamoto, Mobile Communication Platforms for ITS Services, Hitachi Review vol. 52 (2003), No. 1, pp. 55-62.

* cited by examiner

*Primary Examiner*—Emmanuel Bayard

(57) ABSTRACT

A multicarrier base transceiver system includes first control circuitry adapted to receive first control data and voice data from a communications network and arrange the received data into a plurality of logical channels including a paging channel and a plurality of traffic channels for transmission on a first carrier. Second control circuitry is adapted to receive second control data and messaging data, arrange the received messaging data into a plurality of logical traffic channels for transmission on a second carrier, and send the received second control data to the first control circuitry. The first control circuitry transmits the first control data and second control data on the paging channel of the first carrier. A multicarrier mobile station includes first control logic for controlling communications on the first carrier, the first control logic operating in accordance with received paging channel data, and second control logic for controlling communications on the second carrier, the second control logic operating in accordance with data received on the paging channel of the first carrier.

19 Claims, 5 Drawing Sheets

SYSTEM AND METHOD TO INCREASE SECTOR THROUGHPUT IN A MULTI-CARRIER OPERATION

FIELD OF THE INVENTION

The present invention relates generally to wireless communications systems and more particularly to systems and methods for increasing sector throughput in a multi-carrier environment.

BACKGROUND OF THE INVENTION

CDMA2000 is a third-generation (3G) wireless communications standard that uses Code Division Multiple Access (CDMA) to facilitate wireless communications between CDMA base stations and mobile devices. Variants of CDMA2000 include CDMA2000 1x, which provides both voice and data services over a standard CDMA channel, and CDMA2000 Evolution Data-Optimized (1xEV-DO) which is optimized for High Data Rate (HDR) capability. CDMA2000 1xEV-DO Revision B defines a multicarrier system providing peak transmission rates of 73.5 Mbps in the forward link and 27 Mbps in the reverse link by aggregating multiple 1.25 MHz carrier within 20 MHz of bandwidth. Current versions of the CDMA2000 standards are published and approved by the Telecommunications Industry Association and the International Telecommunication Union.

FIG. 1 illustrates exemplary forward link channel structures for use in a CDMA2000 multicarrier system. A base transceiver system 10 provides wireless services through a CDMA2000 1x carrier, which is optimized for voice and data communications, and two CDMA2000 1xEV-DO carriers, which are optimized for high speed data communications. The CDMA2000 1x carrier includes a forward link channel structure 20 which is separated into a plurality of logical channels, each encoded with a unique Walsh code. In operation, a mobile station 12 establishes communication on the CDMA2000 1x carrier 20 by first locating pilot channel 22. After the pilot channel 22 is acquired, the mobile station 12 locates the sync channel 24 which is used for providing synchronization and configuration information to the mobile station 12. Paging channels 26 provide CDMA2000 1x control and paging messages to the mobile station 12. The traffic channels 28 are used for voice and data communications on the CDMA2000 1x carrier 20.

The CDMA2000 1xEV-DO carriers are optimized for high speed data communications and include forward link channels 30 and 40, respectively. Each forward link channel 30 and 40 includes time slots allocated for pilot channels for system acquisition, and control channels for providing control information to mobile stations. In operation, the mobile station 12 separately acquires the pilot and control channels for each 1xEV-DO carrier to set up wireless communications on the respective carrier.

The base transceiver system 10 allocates wireless resources, such as time slots on the 1xEV-DO carriers, to the mobile station 12 based on the mobile user's Quality of Service (QoS) characteristics. A mobile station with high QoS characteristics may be given priority over other mobile stations to ensure data communications to the mobile station are delivered at a high data rate, for example by assigning additional time slots on both forward link channels 30 and 40. As the number of active mobile users increases, the resources available for each user decreases, leading to a decrease in the quality of service experienced by many mobile stations. It is thus desirable to maximize sector throughput in a multicarrier environment to increase overall quality of service.

SUMMARY OF THE INVENTION

The present invention is a system and method for increasing sector throughput in a multicarrier operation. In one aspect of the present invention, a multicarrier base transceiver system includes first control circuitry that is adapted to receive first control data and voice data from a communications network, and arrange the received data into a plurality of logical channels including a paging channel and a plurality of traffic channels for transmission on a first carrier. The multicarrier base transceiver also includes second control circuitry that is adapted to receive second control data and messaging data, arrange the received messaging data into a plurality of logical traffic channels for transmission on a second carrier, and send the received second control data to the first control circuitry. The first control circuitry is adapted to receive the second control data and transmit the first control data and second control data on the paging channel of the first carrier.

In one embodiment, modulation circuitry is provided to encode the first carrier for transmission in a CDMA2000 1x format, and encode the second carrier for transmission in a CDMA2000 1xEV-DO format. The second carrier is coded without a dedicated control channel, thereby increasing the number of traffic channels available on the second carrier.

The second control circuitry may be further adapted to receive third control data for controlling a third carrier, and send the received third control data to the first control circuitry for transmission on the paging channel of the first carrier. The second control circuitry is adapted to separate the received messaging data into a plurality of logical traffic channels for transmission on the second carrier and third carriers. A scheduler allocates timeslots on the second carrier and the third carrier in accordance with quality of service characteristics of active mobile stations.

In another aspect of the present invention, a mobile station includes receiver circuitry for receiving a multicarrier radio frequency signal from a multicarrier base transceiver system. The receiver circuitry includes first demodulation circuitry for decoding the first carrier signal including paging channel data and first traffic data, and second demodulation circuitry for decoding the second carrier signal including second traffic data. A control processor includes first control logic for controlling communications on the first carrier, the first control logic operating in accordance with received paging channel data, and second control logic for controlling communications on the second carrier, the second control logic operating in accordance with data received on the paging channel of the first carrier.

In another aspect of the present invention, a method for facilitating multicarrier wireless communications includes the steps of generating a CDMA2000 1xEV-DO carrier signal including a pilot signal and a plurality of data channels, and generating a CDMA2000 1x carrier signal including a pilot channel, a paging channel and a plurality of voice channels. The paging channel includes control information for both the CDMA2000 1x and the CDMA2000 1xEV-DO carriers. The two carriers are transmitted for reception by at least one multicarrier subscriber unit. The CDMA2000 1xEV-DO carrier signal does not include a control channel, thereby increasing the number of timeslots allocated to traffic channels.

A more complete understanding of the present invention will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 2:
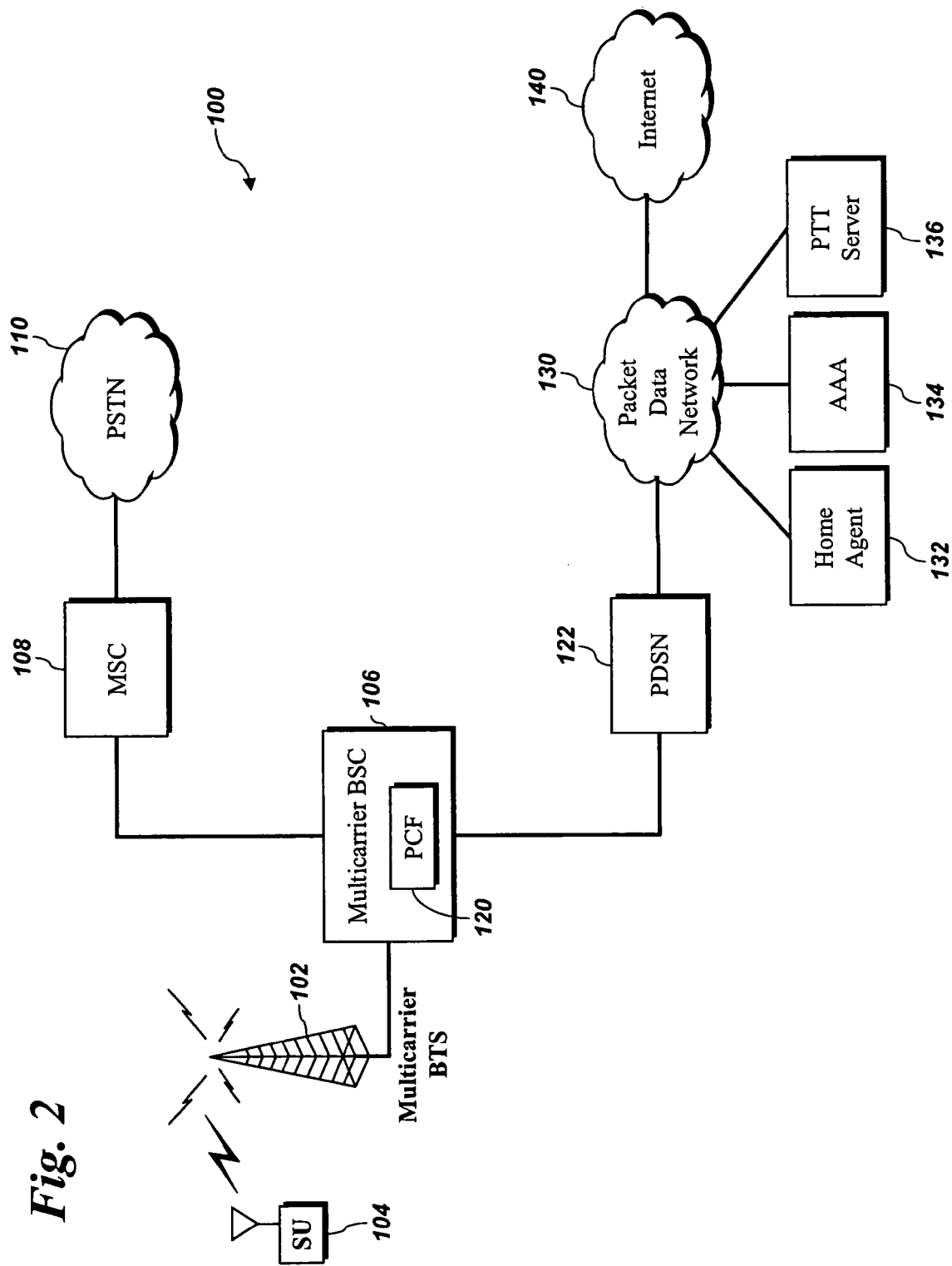
FIG. 2 is an embodiment of a multicarrier wireless network in accordance with an embodiment of the present invention.

An exemplary embodiment of the present invention will now be described with reference to FIG. 2. A multicarrier wireless communications system 100 includes at least one base transceiver system (BTS) 102 adapted to provide wireless communications services to a plurality of subscriber units, such as subscriber unit 104, within a geographical coverage area serviced by the BTS 102. The subscriber unit 104 is adapted to communicate with the BTS 102 by exchanging data packets according to the CDMA2000 1x and CDMA20000 1xEV-DO standards as described herein. Persons having ordinary skill in the art will appreciate that in alternate embodiments the wireless communications system 100 may support other multiple-access wireless communications protocols and technologies such as other CDMA technologies, Orthogonal Frequency Division Multiplexing (OFDM), Multiple Access Advanced Mobile Phone Service (AMPS), Global System for Mobile Communications (GSM), General Packet Radio Services (GPRS), and Push-to-Talk over Cellular (PoC) technologies.

The wireless communications system 100 facilitates at least one mode of communication such as interconnect, push-to-talk (PTT), email, short messaging service (SMS), multimedia messaging service (MMS) and packet data communications. The subscriber unit 104 may be any device adapted for wireless communication with the BTS 102, such as a mobile phone, pager, personal digital assistant (PDA), a Personal Computer Memory Card International Association (PCMCIA) card, or portable computer. In the exemplary embodiment, the BTS 102 and the subscriber unit 104 are adapted to communicate on at least two carrier frequencies, a first carrier providing voice and data communications using CDMA2000 1x and a second carrier providing packet data communications using CDMA20000 1xEV-DO.

A multicarrier base station controller (BSC) 106 manages wireless communications for the BTS 102 and routes CDMA2000 1x voice communications to a mobile switching center 108 which manages calls between subscriber units in the wireless network 100 and between the subscriber unit 104 and at least one communications network, such as a public switched telephone network (PTSN) 110. The BSC 106 routes 1xEV-DO communications to a packet data serving node (PDSN) 122. A packet control function (PCF) 120 provides an interface between the BSC 106 and the PDSN 122, manages packet data sessions and wireless resources, and controls data flow from the PDSN 122 as wireless resources become available.

Figure 1:
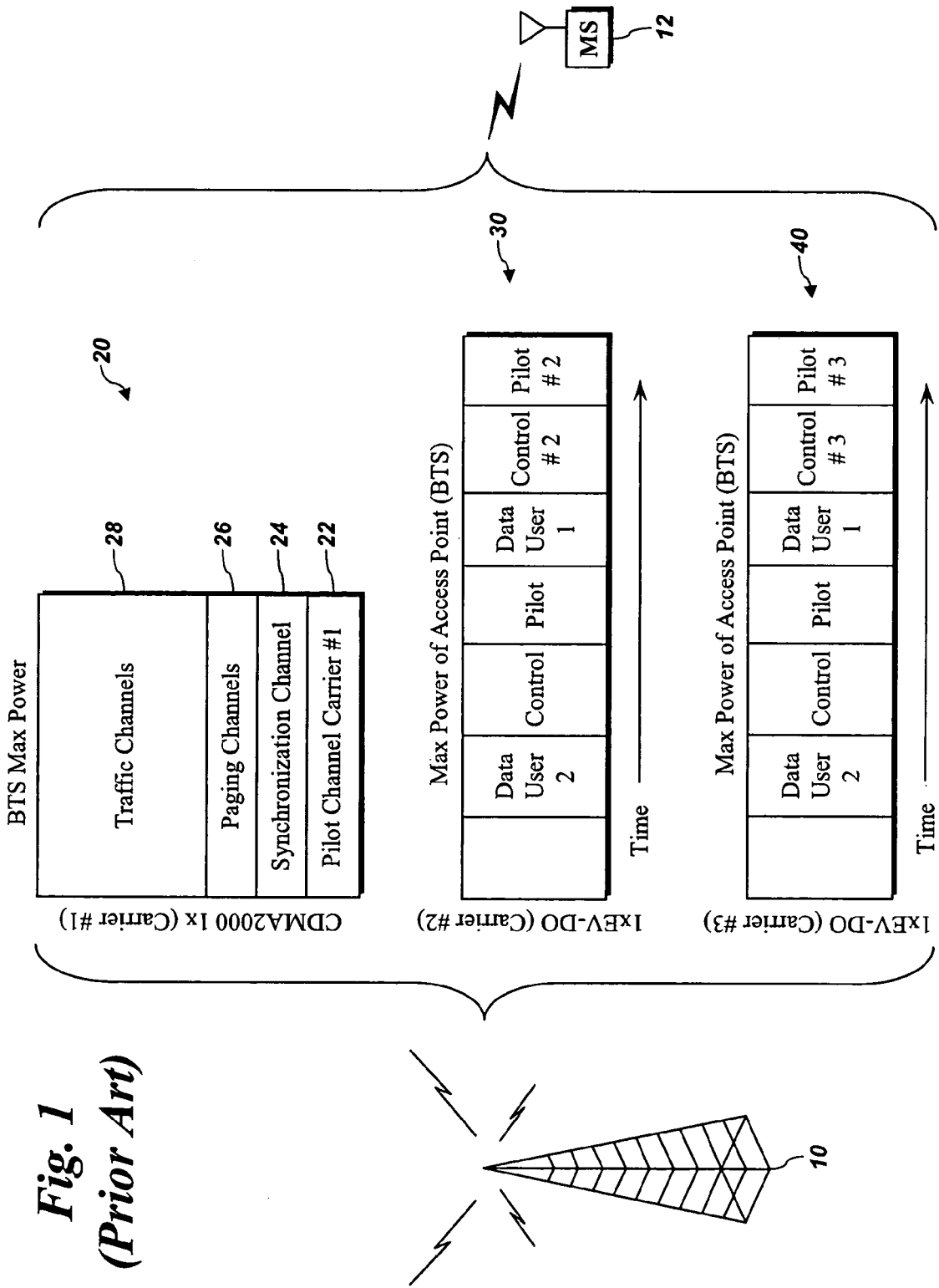
FIG. 1 illustrates forward link channel structures of a prior art multicarrier base transceiver system.

The PDSN 122 routes data packets between the PCF 120 and a packet data network 130, which includes a home agent (HA) 132, an authentication, authorization and accounting (AAA) server 134 and a PTT server 136. The packet data network 130 may also provide access to an external network, such as the Internet 140. It will be appreciated by those having ordinary skill in the art that the wireless network 100 of FIG. 1 is exemplary and that other components, configurations and technologies may be implemented consistent with the spirit and scope of the present invention.

Figure 3:
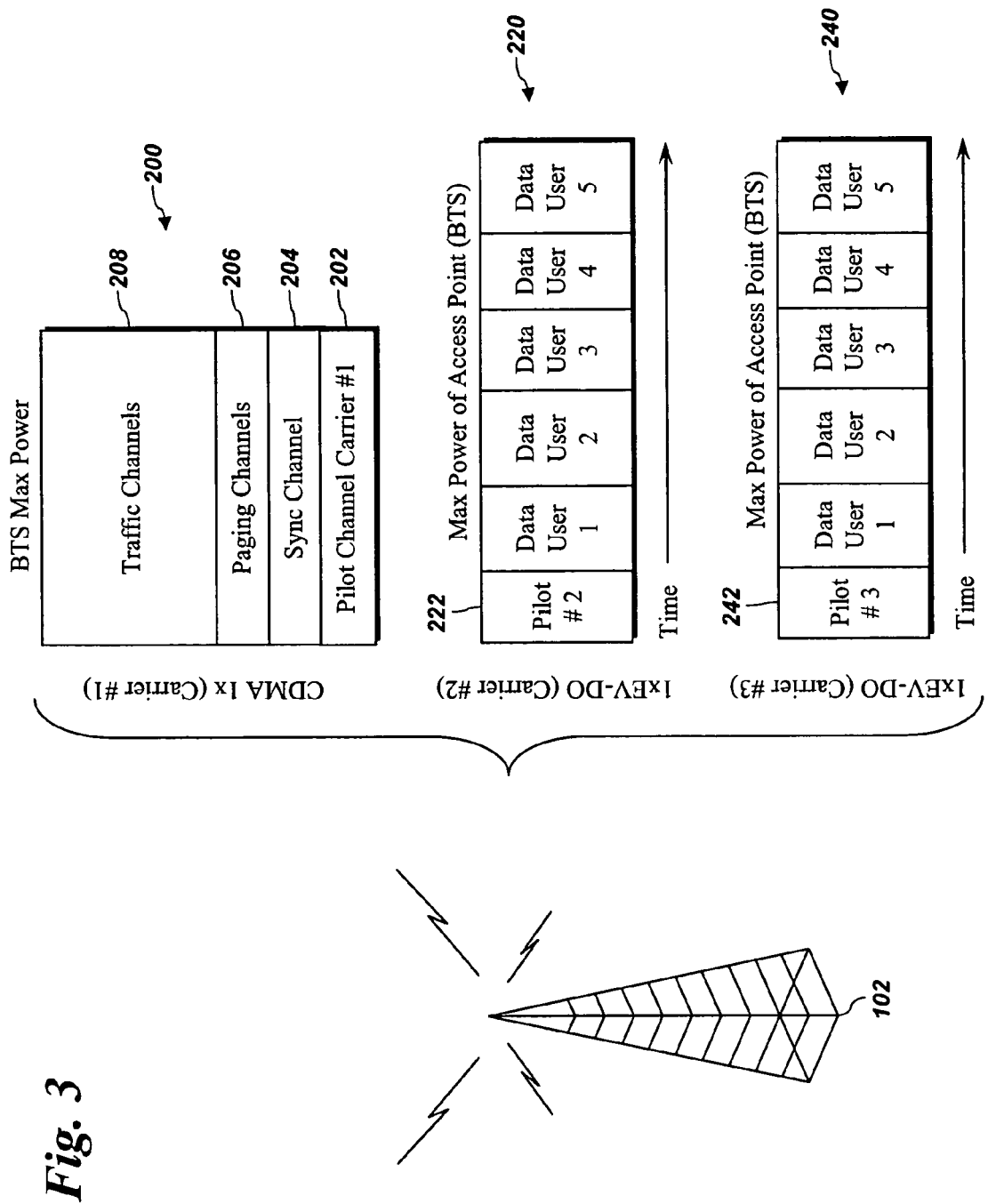
FIG. 3 illustrates an embodiment of a forward link channel structure in accordance with the present invention.

Referring to FIG. 3, an embodiment of a forward link channel structure for use by the multicarrier BTS 102 will now be described. On a first carrier, the BTS 102 is adapted to communicate using a CDMA2000 1x forward link channel structure 200, which includes a pilot channel 202, a synchronization channel 204, paging channels 206 and traffic channels 208. The BTS 102 uses a modified forward link channel structure for Carrier #2 and Carrier #3, which are broadcast using CDMA2000 1xEV-DO. As illustrated each forward link channel, 220 and 240, includes time slots allocated for pilot channels, 222 and 242, respectively, to be used for system acquisition, and a plurality of time slots for use as traffic channels. The 1xEV-DO carriers do not include timeslots allocated for control channels. In one alternate embodiment, the forward link the only control channel in the forward link is a medium access control (MAC) channel which carrier control information for the reverse power control (RPC), data rate control (DRC) lock, and the reverse activity (RA) channels.

In operation, the subscriber unit 104 (see FIG. 2) separately locates the pilot channels 202, 222 and 242 for each carrier to set up wireless communications on the respective carriers. The signals on each pilot channel identify the paging channels 206 on the CDMA2000 1x carrier (Carrier #1) as common control channels for use by all three carriers. The forward link channels 220 and 240 of Carriers #2 and #3 do not include time slots allocated for control channels, which increases the time slots available for user data traffic, thereby increasing sector throughput of the multicarrier system.

Figure 4:
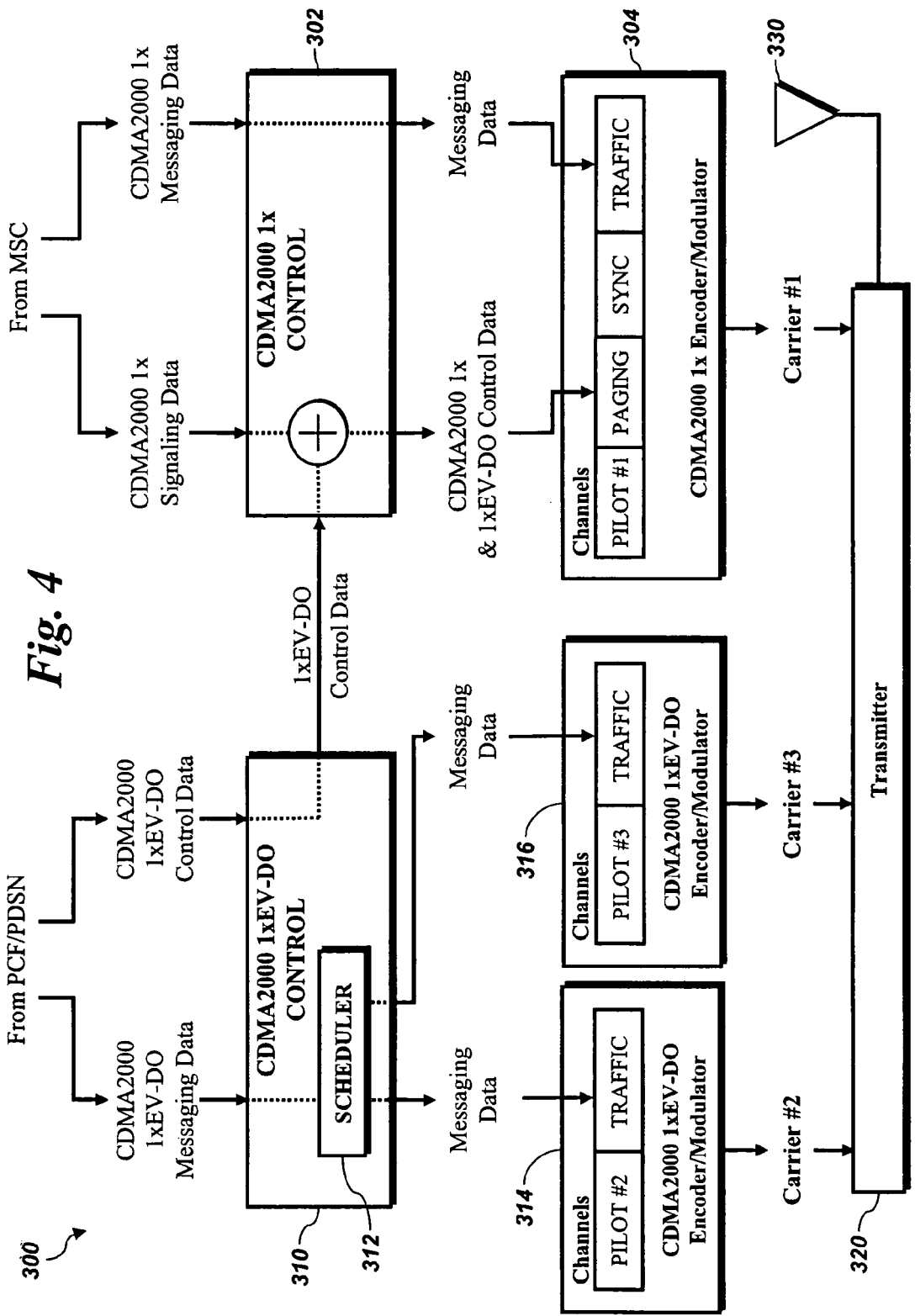
FIG. 4 illustrates logical components and data flow in a base transceiver system in accordance with an embodiment of the present invention.

An embodiment of the forward link logic of a multicarrier base transceiver system 300 is illustrated in the logical block diagram of FIG. 4, and will now be described. The BTS 300 includes CDMA2000 1x Control Logic 302 for processing signaling and messaging data received from the MSC for transmission to subscriber units. Encoding and modulation circuitry 304 codes and combines the pilot, paging, sync and traffic channels for transmission on Carrier #1 via a transmitter 320 and antenna 330.

The BTS 300 also include CDMA2000 1xEV-DO Control Logic 310 for processing control and messaging data received from the packet data network. Scheduling logic 312 allocates resources on the CDMA 1xEV-DO carriers and routes messaging data to appropriate traffic channels. In one embodiment, the scheduling logic 312 allocates timeslots in accordance with Quality of Service (QoS) characteristics of active subscriber units.

In operation, the CDMA2000 1xEV-DO forward link is transmitted at full power and the data is time division multiplexed. Encoding and modulation circuitry 314 and 316, for each respective 1xEV-DO carrier, encodes pilot channel and messaging data into CDMA signals for high data rate transmission. To receive data on a CDMA2000 1xEV-DO channel, a subscriber unit measures signal-to-noise ratio (S/N) on the carrier pilot for every slot, i.e. 1.667 ms. Based on this information, the subscriber unit sends a data rate request to the base transceiver system 300, on a reverse link. The base station transceiver receives requests from a plurality of subscriber units and allocates bandwidth on the forward links according to a scheduling protocol. In one embodiment, the base transceiver system, to achieve the best data transfer rate, gives priority to subscriber units having a good signal to noise ratio, or allocates resources using Quality of Service characteristics.

The CDMA2000 1xEV-DO control logic 310 further includes logic for passing control data, including control data received from the packet data network, to the CDMA2000 1x control logic 302. The CDMA2000 1x control logic 302 formats the 1xEV-DO control data as CDMA2000 1x paging messages and combines the data with the CDMA2000 1x signaling data for transmission on one of the paging channels of the CDMA2000 1x forward link. In one embodiment, new message type is defined and a corresponding identifier is stored in a message header field to identify 1xEV-DO control data to receiving subscriber units.

Figure 5:
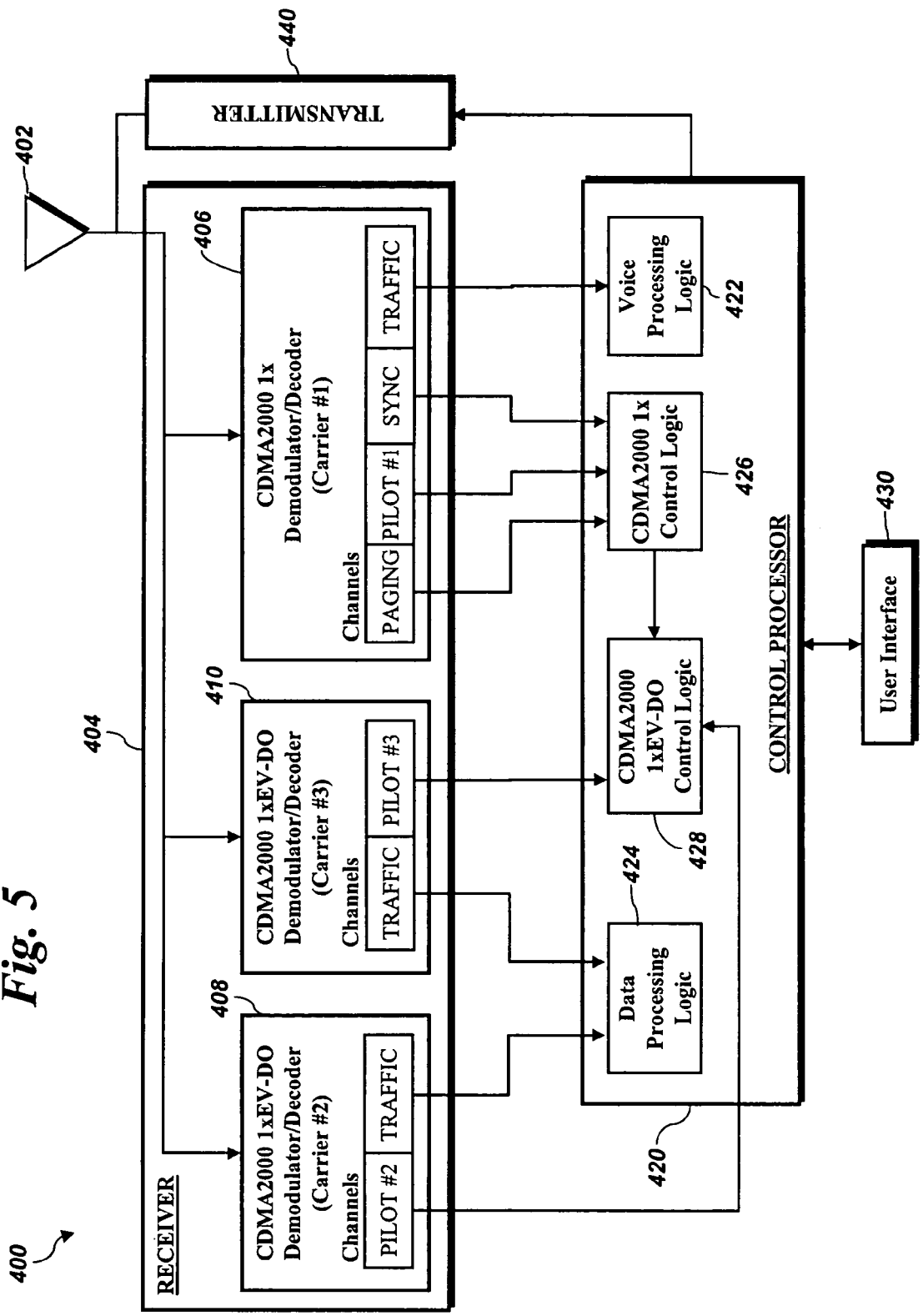
FIG. 5 illustrates logical components of a subscriber unit in accordance with an embodiment of the present invention.

Referring to FIG. 5, a logical representation of a multicarrier subscriber unit 400 in accordance with an embodiment of the present invention will be described. An antenna 402 receives the radio frequency signals transmitted from the base transceiver system 300. A receiving circuitry 404 includes circuitry for demodulating and decoding the received signals into separate channels associated with each of the carriers. In the exemplary embodiment, the receiver includes logic and circuitry 406 for separating out and decoding the channels for carrier #1, including the paging channels, pilot channel, sync channel and traffic channels. The receiving circuitry 404 also includes logic and circuitry, 408 and 410, for separating out and decoding the logical channels for the pilot and traffic channels of carrier #2 and carrier #3, respectively.

A control processor 420 includes logic and circuitry 422 for processing voice and data received on carrier #1, including standard voice communications, and providing communication to the mobile user through a user interface 430. A data application 424 is adapted to process data received through the high speed data connection. In one embodiment, the data application 424 includes an Internet web browser application and the traffic channels deliver web data for display on the user interface 430. In alternate embodiments, the data application 424 includes a voice-over-IP application such as a push-to-talk application. The control processor 420 also includes control logic and circuitry for controlling the radio interfaces on the subscriber unit 400 for communication with the base transceiver system 300. CDMA2000 1x control logic 426 receives and processes pilot data from pilot #1, sync channel information and control/paging data received on the paging channel. In one embodiment, the CDMA20001x logic is adapted to receive the paging information, identify CDMA2000 1xEV-DO control messages as identified through an entry in the message type field, and provide the control message to the CDMA2000 1xEV-DO control logic. CDMA2000 1xEV-DO control logic 428 controls the CDMA2000 1xEV-DO carriers including receiving pilot #2 and pilot #3 and receiving control data from the CDMA2000 1x paging channel.

A transmitter 440 includes circuitry for converting digital signals to analog and transmitting the analog signals across a wireless communications link through the antenna 402. The transmitter 440 is adapted to transmit signals to the base transceiver system 300 using reverse links on the CDMA2000 1x and 1xEV-DO carriers. In one embodiment, the receiver 404, control processor 420 and transmitter 440 may be implemented as a single processor with program memory storing program logic or a combination of processors and dedicated circuitry including application specific integrated circuits (ASICs) and digital signal processors.

In one embodiment, the subscriber unit 400 is a mobile telephone, and the user interface 430 includes circuitry and components for providing a user of the subscriber unit 400 with a numeric keypad for user input of telephone numbers and other information, and a visual display.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. A multicarrier base transceiver system comprising:
   first control circuitry adapted to receive first control data and voice data, and arrange the received data into a plurality of logical channels including a paging channel and a plurality of traffic channels for transmission on a first carrier;
   second control circuitry adapted to receive second control data and messaging data and is further adapted to receive third control data, arrange the received messaging data into a plurality of logical traffic channels for transmission on a second carrier and a third carrier, and send the received second control data and third control data to the first control circuitry; and
   wherein the first control circuitry is adapted to receive the second control data and transmit the first control data and second control data on the paging channel of the first carrier.

2. The multicarrier base transceiver system of claim 1 further comprising first modulation circuitry adapted to receive data arranged in logical channels from the first control circuitry and encode the corresponding logical channels for transmission in a CDMA2000 1x format.

3. The multicarrier base transceiver system of claim 2 further comprising second modulation circuitry adapted to receive data arrange in logical channels from the second control circuitry and encode the corresponding logical channels for transmission in a CDMA2000 1xEV-DO format.

4. The multicarrier base transceiver system of claim 3 wherein the second carrier does not include a CDMA2000 1xEV-DO control channel.

5. The multicarrier base transceiver system of claim 3 wherein a CDMA2000 1xEV-DO control channel is encoded as a traffic channel.

6. The multicarrier base transceiver system of claim 1 further comprising a scheduler adapted to allocate timeslots on the second carrier and third carrier in accordance with quality of service characteristics of active subscriber units.

7. In a multicarrier system including a base transceiver system communicating, on a first carrier adapted for voice transmission and a second carrier adapted for high data rate transmission, a mobile station comprising:
   receiver circuitry for receiving a multicarrier radio frequency signal from the base transceiver system, the receiver circuitry including first demodulation circuitry for decoding the first carrier signal including paging channel data and first traffic data, and second demodulation circuitry for decoding the second carrier signal including second traffic data; and a control processor including first control logic for controlling communications on the first carrier, the first control logic operating in accordance with received paging channel data, and second control logic for controlling communications on the second carrier, the second control logic operating in accordance with data received on the paging channel of the first carrier.

8. The mobile station of claim 7 wherein the first carrier is a CDMA2000 1x carrier.

9. The mobile station of claim 7 wherein the second carrier is a CDMA2000 1xEV-DO carrier.

10. The mobile station of claim 9 wherein the second carrier does not include a control channel.

11. The mobile station of claim 7 wherein the receiver circuitry further comprises third demodulation circuitry for decoding a third carrier signal including third traffic data; and
wherein the control processor further includes third control logic for controlling communications on the third carrier, the third control logic operating in accordance with data received on the paging channel of the first carrier.

12. The mobile station of claim 11 further comprising data processing logic for processing data received on the traffic channels of the second and third carriers.

13. The mobile station of claim 12 wherein the data processing logic includes a voice-over-IP application.

14. The mobile station of claim 7 further comprising voice processing logic for converting traffic data received on the first carrier into voice signals for producing an audio output through a user interface.

15. A method for facilitating multicarrier wireless communications comprising the steps of:
generating a CDMA2000 1xEV-DO carrier signal including a pilot signal and a plurality of data channels;
generating a CDMA2000 1x carrier signal including a pilot channel, a paging channel and a plurality of voice channels, the paging channel including control information for both the CDMA2000 1x and the CDMA2000 1xEV-DO carriers; and
transmitting the generated carrier signals for reception by at least one mobile device.

16. The method of claim 15 wherein the CDMA2000 1xEV-DO carrier signal does not include a control channel.

17. The method of claim 15 further comprising generating a second CDMA2000 1xEV-DO signal including a second pilot signal and a plurality of data channels.

18. The method of claim 15 further comprising receiving data for transmission on the CDMA2000 1xEV-DO carrier signal, the data including control data for managing wireless CDMA2000 1xEV-DO communications.

19. The method of claim 18 further comprising receiving CDMA2000 1xEV-DO signals from a mobile station on the CDMA2000 1xEV-DO carrier, the CDMA2000 1xEV-DO signals including CDMA2000 1xEV-DO control information for the mobile station.

* * * * *